J. VETTER.
AUTOMOBILE TOP.
APPLICATION FILED MAY 6, 1918.
1,298,836.
Patented Apr. 1, 1919.
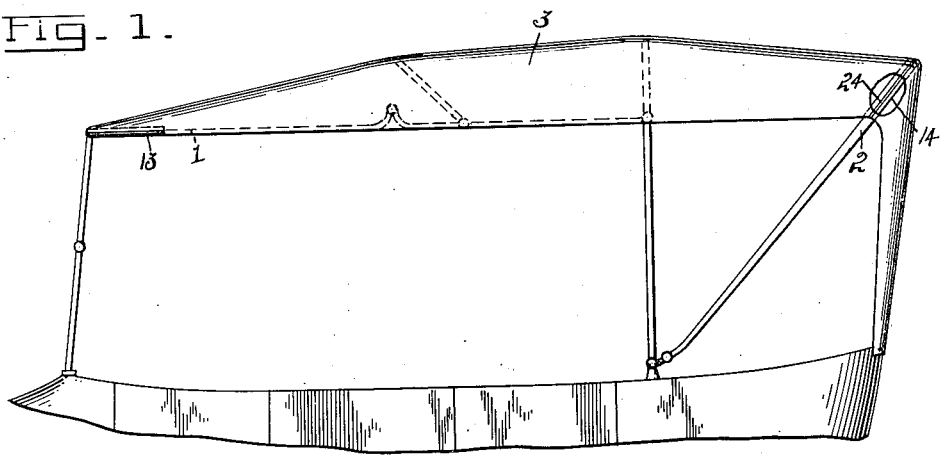
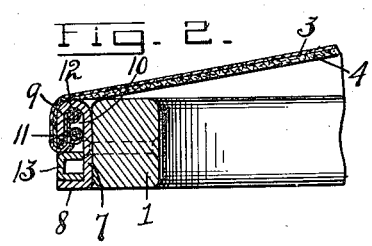
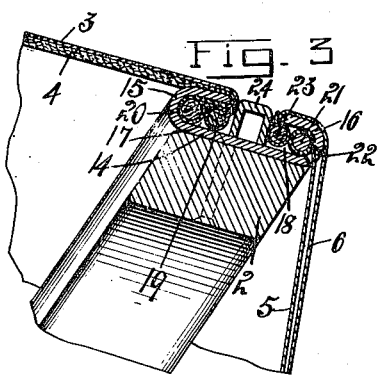
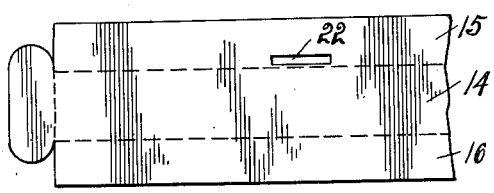
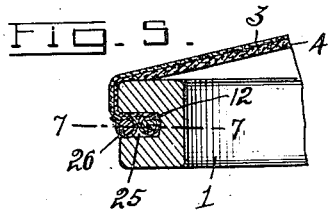
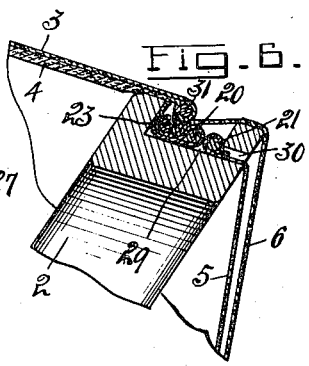
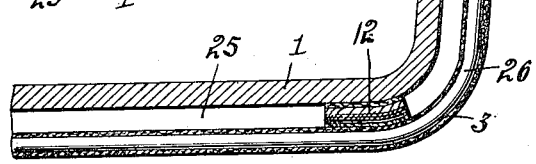
INVENTOR.
Joseph Vetter,
By Owen, Owen & Crampton
His attys.

UNITED STATES PATENT OFFICE.

JOSEPH VETTER, OF TOLEDO, OHIO.

AUTOMOBILE-TOP.

1,298,836.     Specification of Letters Patent.   Patented Apr. 1, 1919.

Application filed May 6, 1918. Serial No. 232,792.

*To all whom it may concern:*

Be it known that I, JOSEPH VETTER, a citizen of the United States, and a resident of Toledo, in the county of Lucas and State of Ohio, have invented a certain new and useful Automobile-Top; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tops for automobiles or the like and particularly to means for securing the covers to the top frames.

The object of my invention is the provision of simple and efficient means for securing the cover of an automobile or the like and the top padding strips and rear straps to the supporting bows of the top frame in an easy and rapid manner without the use of buttons, tacks or the like, thus materially facilitating the upholstering of tops of this character and lessening the expense and labor incident thereto.

The invention is fully described in the following specification, and while, in its broader aspect, it is capable of embodiment in numerous forms, a preferred and a modified form thereof are illustrated in the accompanying drawings, in which,—

Figure 1 is a side elevation of a top embodying the invention. Figs. 2 and 3 are enlarged cross-sectional views of the front and rear frame bows of the top and associated parts. Fig. 4 is a fragmentary plan of the blank from which the rear bow cover engaging means is formed. Figs. 5 and 6 are cross-sections similar to Figs. 2 and 3, respectively, and embodying a slightly modified form of the invention, and Fig. 7 is a fragmentary section on the line 7—7 in Fig. 5, with parts in full.

Referring to the drawings, 1 and 2 designate the front and rear frame bows, respectively, of an automobile top of the foldable type, 3 the deck covering therefor, 4 the customary padding strip, one of which extends from the front to the rear bow along each side roll at the top, 5 one of the customary straps which extends from the rear bow down to the back of the automobile body, and 6 the back covering of the top, as well understood in the art.

In carrying out my invention the front bow 1 is provided in its outer face or front side with a longitudinally extending recess which has its end portions extending a short distance along the bow legs so that the recess is substantially U-shape in form. In one embodiment of the invention said recess is formed by a channel strip 7, preferably of metal, which strip has the straight flange 8 extending at right angles to its bottom and the top flange 9, which is turned over in spaced parallel relation to the channel bottom to form the top portion of the channel with the downwardly opening recess 10. The front edges or ends of the top cover 3 and padding strips 4 are beaded, as shown at 11 and 12, respectively, and introduced into the recess 10, the strip beads first, and with the material of the cover and strips extending downward from said beads around the edge of the flange 9 and thence upward and rearward over the front bow. A retaining member 13, conforming to the longitudinal contour of the channel strip 7 and bowed if such strip is bowed, which is usually and preferably the case, is removably sprung or fitted into the channel of said strip between the flanges 2 and in binding engagement with the material of the cover 3 and strips 4 extending around the flange 9, as shown in Fig. 2, thereby preventing a withdrawal of the beads 11 and 12 from the recess 10.

The rear bow 2 of the top is provided on its top with a U-shaped channel strip 14, which extends longitudinally around the portion of the bow 2 inclosed by the cover 3 and is substantially the same in cross-sectional contour as the channel strip 7, except that it is larger and has both side flanges 15 and 16 thereof turned over in spaced parallel relation to the channel bottom to form the channel with a front recess 17 and a rear recess 18, as shown in Fig. 3. The rear edges or ends of the cover 3 and padding strips 4 are provided with beads 19 and 20, respectively, which are introduced into the front recess 17 of the channel strip 14, the beads 20 first. The rear straps 5 have their upper ends provided with beads 21 and inserted into the original recess 18, the straps thence extending rearward and downward from the beads through registering slots or openings 22 in the flange 16 and have their lower ends attached in any suitable manner to the back of the automobile body.

The back cover 6 of the top has its upper edge extending over and around the flange 16 and provided with a bead 23, which is disposed in the recess 18 without the beads 21. A retaining member 24, conforming in longitudinal contour to the channel strip 14 is sprung or fitted into the channel of said strip and between the adjacent edges of the flanges 15 and 16 and prevents a withdrawal of the beads 19, 20 and 23 from the channel.

In the modification of the invention illustrated in Figs. 5 and 7 the front bow 1 is provided in its outer or front side with a narrow groove 25, which extends at its ends a short distance along each leg of the bow and is of suitable width to receive the beads 12 at the front ends of the padding strips, and is of greater depth than the thickness of said beads. The bead at the front end of the cover 3 is formed by securing a U-shaped spring bar or rod 26 within an edge loop of the cover and this bead is inserted in the groove 25 without the beads 12 to prevent a withdrawal of the latter from the groove. The end or leg terminals of the bead rod 26 are turned inward to form spurs 27, which spring into registering sockets 28 in the end portions of the groove and coöperate therewith to retain the cover bead in the groove. The rear bow 2 in its modified form (Fig. 6) has its top side provided with a longitudinally extending groove 29, the ends of which extend down the legs of the bow to adjacent the lower side edge portions of the top cover and this groove is of sufficient width to receive the beads 20, 21 and 23 of the padding strips 4, rear straps 5 and the cover back 6, respectively. In positioning the beads 20, 21 and 23 side by side in the groove, the beads 20 are disposed between the other two beads and the padding strips 4 extend from the beads 20 under the bead 23 and thence up and forward around the front edge wall of the groove. The straps 5 extend rearward and downward from the groove 29 through registering slots or openings 30 in the rear wall of the groove. A spring rod 31 extends through a loop along the rear edge of the cover 3 and is similar in shape to the spring rod 26 at the front end of the cover so that its leg ends may be sprung into holding engagement with sockets at the respective end portions of the groove 29. The spring rod 31 is positioned over the beads 20 and 23 in downward pressure against each and retains said beads in assembled position within the groove 29.

I wish it understood that my invention is not limited to any specific construction, arrangement or form of the parts as it is capable of numerous changes and modifications without departing from the spirit of the claims.

Having thus described my invention, what I claim as new and desire to secure by Letters Patent, is,—

1. In a top of the class described, a frame bow having a channel formed therein longitudinally thereof and having an edge recess, a plurality of beads removably disposed in said recess and having material extending from each without the recesses, and means removably seating in said channel and serving to retain the beads in the recess.

2. In a top of the class described, a frame bow having a longitudinally extending channel in the outer side thereof provided with inwardly opening recesses at its opposite edges, a bead disposed in each of said recesses and having material extending therefrom without the respective recesses and a member removably seating in the channel between said recesses and serving to retain the beads therein.

3. In a top of the class described, a frame bow, a channel strip mounted on the outer side of said bow longitudinally thereof and having opposite edge flanges with one of said flanges turned over in substantially parallel relation to the channel bottom to form an inwardly opening edge recess, a top cover and a beading strip each having an end edge provided with a bead and inserted in said recess, and a retaining strip removably seating in said channel without said recess and coöperating with the channel strip to retain said beads in engagement therewith.

4. In a top of the class described, a frame bow, a channel strip mounted on the outer side of said bow longitudinally thereof and having its opposite edge flanges turned over to form inwardly opening recesses, a cover and padding strips having end edges thereof beaded and inserted in one of said recesses, a cover back and straps having their upper ends beaded and seated in the other of said recesses, and an elongated retaining member removably seating in said channel strip between its edge flanges and coöperating therewith to prevent a withdrawal of said beads from the respective recesses.

5. In a top of the class described, a frame bow having a longitudinally extending groove in the outer side thereof with an opening in one side wall of the groove, a bead disposed in said groove and having a strip of material extending therefrom through said opening, and means coacting with said bead within the groove to prevent a removal of the bead from the groove.

6. In a top of the class described, a frame bow having a longitudinally extending groove in the outer side thereof with an opening in one side wall of the groove, a plurality of beads disposed in said groove and each having material extending therefrom with the material which extends from one bead projecting outward through said opening, and means coacting with said beads within the groove for removably retaining them therein.

7. In a top of the class described, a frame bow having a longitudinally extending groove in its outer side with the ends of said groove extending down the legs of the bow, a plurality of beads removably mounted in the base of said groove and a spring rod mounted in the groove without said beads and coöperating therewith to prevent a withdrawal of the beads from the groove, said rod being substantially U-shaped and having its ends normally sprung inward into releasable interengagement with the bow, said beads each having material extending therefrom without the groove.

8. In a top of the class described, a frame bow having a longitudinally extending groove in its outer side, a plurality of beads disposed in said groove in transversely spaced relation, a padding strip extending from a center bead under and around an adjoining bead before passing from the groove, a rear cover extending from one end bead and a rear strap extending from another end bead without said groove, and a retaining member disposed in the groove without said beads in coaction therewith to prevent their withdrawal from the groove, said member being releasably engaged to the bow adjacent to the end portions of the groove, and a cover strip attached to and extending from said member.

In testimony whereof, I have hereunto signed my name to this specification.

JOSEPH VETTER.